United States Patent
Shah (10) Patent No.: US 8,863,114 B2
(45) Date of Patent: Oct. 14, 2014

(54) MANAGING SOFTWARE PACKAGES USING A VERSION CONTROL SYSTEM

(75) Inventor: Amit Shah, Pune (IN)

(73) Assignee: Red Hat, Inc., Raleigh, NC (US)

( * ) Notice: Subject to any disclaimer, the term of this patent is extended or adjusted under 35 U.S.C. 154(b) by 612 days.

(21) Appl. No.: 12/960,820

(22) Filed: Dec. 6, 2010

(65) Prior Publication Data

US 2012/0144378 A1 Jun. 7, 2012

(51) Int. Cl.
*G06F 9/445* (2006.01)
(52) U.S. Cl.
USPC .......................................... 717/175
(58) Field of Classification Search
USPC ............ 717/168–169, 175–178; 707/622, 10; 711/154, 162; 709/217, 223, 203; 380/255; 455/418
IPC ...................... H04L 67/06,67/2842; G06F 8/61
See application file for complete search history.

(56) References Cited

U.S. PATENT DOCUMENTS

| | | | | |
|---|---|---|---|---|
| 2002/0161980 A1* | 10/2002 | Nishikawa | | 711/162 |
| 2003/0200541 A1* | 10/2003 | Cheng et al. | | 717/169 |
| 2004/0224674 A1* | 11/2004 | O'Farrell et al. | | 455/418 |
| 2005/0132349 A1* | 6/2005 | Roberts et al. | | 717/168 |
| 2007/0150478 A1* | 6/2007 | Cho et al. | | 707/10 |
| 2009/0252325 A1* | 10/2009 | Reus et al. | | 380/255 |
| 2012/0023154 A1* | 1/2012 | Demant et al. | | 709/203 |

OTHER PUBLICATIONS

"Git User's Manual (for version 1.5.3 or newer)" downloaded from http://www.kernel.org/pub/software/scm/git/docs/user-manual.html, Oct. 14, 2010, 92 pages.
Brown, Robert G. et al., "Yum (Yellowdog Updater, Modified) HOWTO" Sep. 24, 2003, 39 pages.

* cited by examiner

*Primary Examiner* — Tuan A Vu
(74) *Attorney, Agent, or Firm* — Lowenstein Sandler LLP (57) ABSTRACT

A client version control system (VCS) accesses a remote VCS to retrieve the difference between current metadata stored locally representing a first version of the software packages currently installed and newer metadata representing a second version of the software packages available from a server for distribution, without having to download the entire newer metadata. The client VCS generates the newer metadata based on the current metadata and the difference of the current and newer metadata retrieved from the remote VCS. A package manager coupled to the client VCS to download the second version of the software package from the server based on the newer metadata then installs or updates newer releases of software packages as available from the distribution server.

15 Claims, 4 Drawing Sheets

MANAGING SOFTWARE PACKAGES USING A VERSION CONTROL SYSTEM

TECHNICAL FIELD

Embodiments of the present invention relate generally to software package management. More particularly, embodiments of the invention relate to software package management using a version control system.

BACKGROUND

In a distributed computing environment, certain applications such Unix applications have primarily been distributed as source code. To install a new application, a user has to download the source code for that application from a distributed server. Typically, the source code is provided in some sort of archive (such as the Zip archival and compression format often used in the Windows® world or the tar archive format typically used in the Unix® world) that the user must then unpack. After unpacking this source code, the user has to configure it to support the options and systems he/she wants, compiling it to produce an executable program that can run on a particular operating system.

Generally, files are packaged into one or more packages for distribution. A package manager running in a computer is designed to download, unpack, and install the packages. The package manager is also configured to update any software packages installed in the local machine by downloading new versions of the packages. Typically, when updating a software package, a package manager may download metadata of the package from a distributed server and compare the newly downloaded metadata with the metadata of the software package currently installed. Based on the comparison of the metadata, if the package manager determines that a new version of the package is available, the package manager then downloads, unpacks, and installs the new package. The metadata is usually in a script format such as extensible markup language (XML) data (or in sqlite databases). As more new packages are made available in the distribution repository, the metadata stored therein keeps growing. Thus, downloading such metadata for updating purposes requires longer and longer time and consumes more and more resources.

BRIEF DESCRIPTION OF THE DRAWINGS

The present invention is illustrated by way of example and not limitation in the figures of the accompanying drawings in which like references indicate similar elements.

DETAILED DESCRIPTION

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, metadata associated with software packages is centrally stored in a server and managed by a software version control system (VCS). When there is a need to update a particular software package, a package manager (PM) of a client machine is configured to invoke, for example, via an application programming interface (API), a VCS client module to communicate with a VCS server module of the server to identify differences (e.g., delta) between first metadata of the software package currently installed in the client machine and second metadata of a newer version of the package available for distribution. Based on the identified differences, the VCS client module is configured to download the differences between the first and second metadata without having to download all of the newer metadata of the newer versions of all the packages available for install.

Based on the downloaded differences and the first metadata of currently installed software packages, the VCS client module can reconstruct the newer metadata locally at the client machine, where the second metadata represents the newer version of the software package. Based on the comparison of the first and second metadata, if there is a need to download the newer version of the software package (or packages), the package manager can then access a distribution server to download the newer version of the software package. The distribution server may be the same or different server as the VCS system. As a result, the client machine can maintain a relatively small size of metadata and downloading metadata takes less time and requires less network traffic or bandwidth. It also uses fewer resources on the server since they don't have to serve all the metadata, just the differences.

Figure 1:
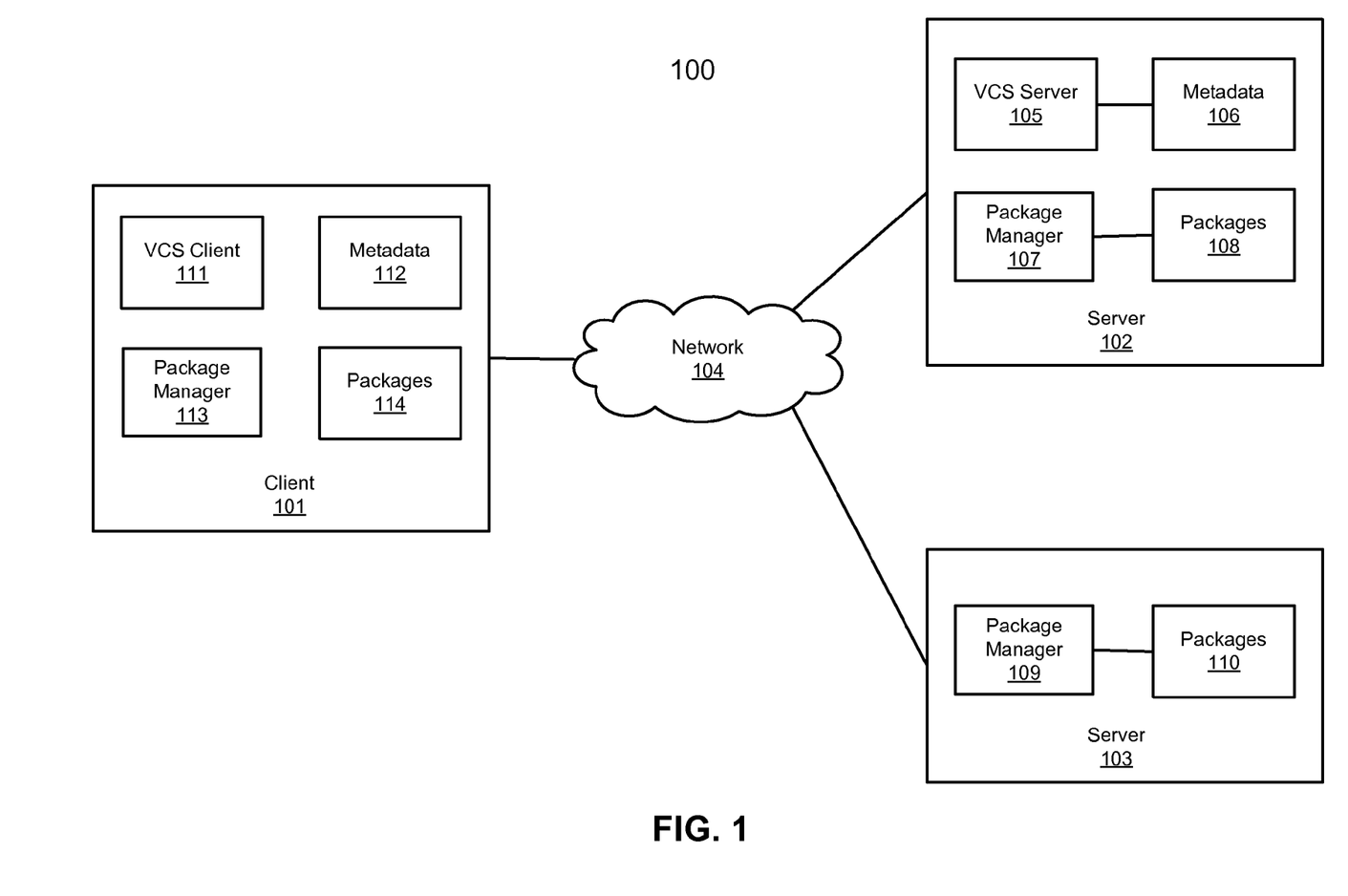
FIG. 1 is a block diagram illustrating a network system which may be used with an embodiment of the invention.

FIG. 1 is a block diagram illustrating a network system which may be used with an embodiment of the invention. Referring to FIG. 1, system 100 includes, but is not limited to, one or more clients 101 communicatively coupled to servers 102-103 over a network 104, which may be a local area network (LAN), a wide area network (WAN) such as Internet, or a combination of both. Network 104 may be a wired network, a wireless network, or a combination of both. Client 101 may be any kind of computing devices, such as desktops, laptops, tablets, handheld devices (e.g., smartphones), media players, gaming devices, or a combination thereof. Servers 102-103 may be any kind of distribution servers that are used to distribute software packages for download and installation. For example, servers 102-103 may be management servers such as Red Hat® management servers (e.g., Red Hat Network™ or Red Hat virtualization management server) available from Red Hat, Inc. of Raleigh, N.C.

In one embodiment, server 102 includes VCS (also referred to as a revision control system or RCS) server module 105 to manage various versions of metadata 106 in a VCS database or repository, which may be located locally or remotely with respect to server 102. VCS server module 105 can be any kind of VCS systems available from a variety of vendors. Revision control, also known as version control, source control or software configuration management (SCM), is the management of changes to documents, programs, and other information stored as computer files. It is most commonly used in software development, where a team of developers may change the same files. Changes are usually identified by a number or letter code, termed the "revision number", "revision level", or simply "revision". For example, an initial set of files is "revision 1". When the first change is made, the resulting set is "revision 2", and so on. The popular GIT VCS identifies changes by the SHA-1 checksum of the entire change and the change details. Each revision is associated with a timestamp and the person making the change. Revisions can be compared, restored, and with some types of files, merged.

In one embodiment, VCS server module 105 may be part of a GIT VCS system. GIT is a version control system designed to handle large projects with speed and efficiency; it is used for many open source projects, most notably the Linux kernel. GIT falls in the category of distributed source code management tools. Every GIT working directory is a full-fledged repository with full revision tracking capabilities, not dependent on network access or a central server.

In addition, according to one embodiment, server 102 includes package manager module 107 (e.g., a server module of a package management system) for managing and distributing a variety of software packages 108. Package manager 107 is responsible for authorizing and/or authenticating a client, such as client 101, for the purpose of distributing software packages 108 to the client. In one embodiment, package manager 107 is implemented as part of Red Hat package management (RPM™) system. In other embodiments, package manager 107 is a Windows™ update component, Mac OS™ component, or any other components providing updates for a specific operating system (OS).

A software package management system (PMS) is a collection of software tools to automate the process of installing, upgrading, configuring, and removing software packages for a computer's operating system in a consistent manner. It typically maintains a database of software dependencies and version information to prevent software mismatches and missing prerequisites. Packages are distributions of software, applications and data. Packages also contain metadata, such as the software's name, description of its purpose, version number, vendor, checksum, and a list of dependencies necessary for the software to run properly. Upon installation, metadata is stored in a local package database. Distributions of Linux and other Unix-like systems typically consist of hundreds or even thousands of distinct software packages; in the former case, a package management system is a convenience, in the latter case it is essential.

Package management systems are charged with the task of organizing all of the packages installed on a system. Typical functions of a package management system include verifying file checksums to ensure correct and complete packages, verifying digital signatures to authenticate the origin of packages, applying file archivers to manage encapsulated files, upgrading software with latest versions, typically from a software repository, grouping of packages by function to help eliminate user confusion, and managing dependencies to ensure a package is installed with all packages it requires.

In one embodiment, referring back to FIG. 1, client 101 includes VCS client module 111 and package manager 113 (e.g., a client module of a package management system). VCS client module 111 may be a GIT compatible client module that communicates with corresponding VCS server module 105 of server 102 to store (e.g., check in) and/or retrieve (e.g., check out) certain versions of metadata 106. Package manager 113 may be a client module of a RPM compatible system, or an update component of other operating systems such as Windows® or Mac OS®, etc. In one embodiment, package manager 113 includes a software updater or updating tool, such as a Yellowdog Updater, Modified (YUM) module, for the purpose of updating local software packages 114 from software packages 108 and/or 110 distributed by package manager 107 of server 102 and/or package manager 109 of server 103, respectively. YUM is an open-source command-line package-management utility for RPM-compatible Linux operating systems.

When a user interacts with the package management software to bring about an upgrade, it is customary to present the user with the list of things to be done (usually the list of packages to be upgraded, and possibly giving the old and new version numbers), and allow the user to either accept the upgrade in bulk, or select individual packages for upgrades. Each package manager relies on the format and metadata of the packages it can manage. That is, package managers need groups of files to be bundled for the specific package manager along with appropriate metadata, such as dependencies. Often, a core set of utilities manages the basic installation from these packages and multiple package managers use these utilities to provide additional functionality. For example, YUM relies on RPM as a backend. YUM extends the functionality of the backend by adding features such as simple configuration for maintaining a network of systems. While an RPM contains a single package and metadata related to that package, YUM manages groups of packages and metadata relating to all those packages. For example, YUM manages the metadata for all the packages available as part of a distribution (e.g., Fedora 14 or Red Hat Enterprise Linux 6.0). In this case, a YUM metadata update reflects the updated package versions for all the packages available in the software repository. The software repository is the collection of packages that collectively is called a Fedora 14 distribution, for example.

Referring back to FIG. 1, an administrator or user can program package manager 113 to periodically (automatically or manually) determine whether a new or different version of a particular software package (or, indeed, all the installed software packages in the system) is available for distribution. According to one embodiment, package manager 113 is capable of automatically synchronizing the remote metadata (e.g., metadata 106) to the local client (e.g., metadata 112). In response to a request (e.g., automated scheduled event or a manual request from a user) for synchronizing metadata 112, package manager 113 is configured to invoke, for example, via an API (or by invoking the tool directly), VCS client 111 to communicate with VCS server 105 of server 102 to obtain the differences between the version of local metadata 112 and a newer or latest version of remote metadata 106. That is, instead of downloading entire metadata for the newer or different version of the software packages, only the differences between the newer or different version and the local version of metadata are downloaded to client 101 from server 102. As a result, the time to download and/or the network traffic can be significantly reduced.

In one embodiment, package manager 113 may provide information identifying a current version of metadata 112 currently stored locally, where the metadata represents a current version of a software package currently installed. Note that the metadata could be common for all the packages in the repository. It does not matter if only one package details got updated in the distribution repository (even for a package that is not installed on the local system), the entire metadata file has to be fetched since it's newer. In response, VCS client 111 interrogate with VCS server 105 to determine whether there is a newer version of the metadata. If so, VCS client 111 may instruct VCS server 105 to download the difference between the local version of metadata and the remote version of the metadata. Alternatively, the VCS server will send the difference to the VCS client.

Based on the differences between a local version of metadata 112 and a remote version of metadata 106, VCS client 111 is able to reconstruct the entire remote version of the metadata. Based on the metadata of a remote software package provided by VCS client 111, package manager 113 can decide whether the remote software package should be downloaded, for example, by comparing the remote metadata against the ones that have previously downloaded and stored locally. If so, package manager 113 can communicate with package manager 107 of server to download the remote software package 108. Alternatively, package manager 113 can communicate with package manager 109 of another distribution server (or mirror) 103 to download remote software package 110. Note that in some situations, package managers 107 and 109 are optional dependent upon the specification configurations. Package managers 107 and 109 merely represent any application or process that is responsible for sending or distributing software packages to clients such as client 101.

Figure 2:
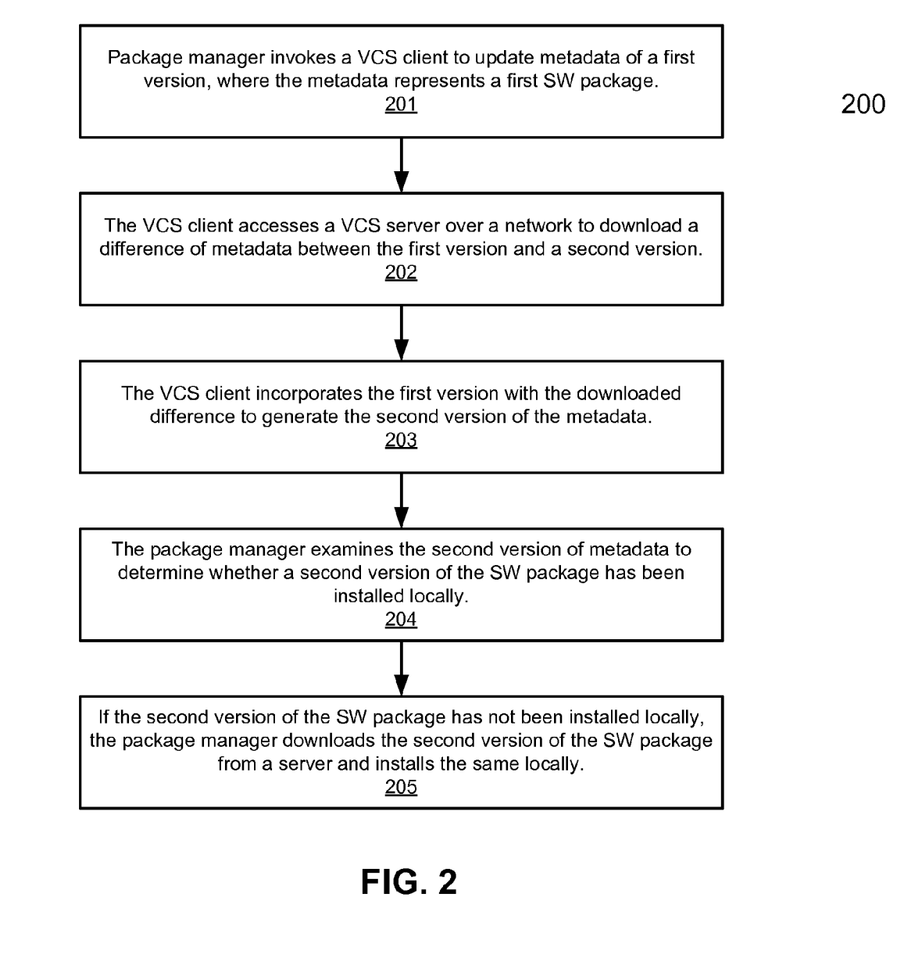
FIG. 2 is a flow diagram illustrating a method for updating software packages according to one embodiment of the invention.

FIG. 2 is a flow diagram illustrating a method for updating software packages according to one embodiment of the invention. For example, method 200 may be performed by VCS client 111 and/or package manager 113 of client 101 of FIG. 1. Referring to FIG. 2, at block 201, a package manager invokes, for example, via an API, a VCS client module of a client machine to update metadata of all the software packages available in the repository. The metadata is always of the complete repository—not specific to individual packages and not specific to packages installed locally on the client. Such an update may be triggered automatically by a software updater such as a YUM module and then scheduled by an administrator or alternatively, on demand by a user. At block 202, the VCS client module accesses a VCS server over a network to download the difference of the metadata between the current version on the client and the latest version on the server, without having to download the entire latest version of the metadata. Such a VCS client may be part of GIT RCS system as described above. At block 203, the VCS client incorporates the difference downloaded from the VCS system with the local version of metadata to generate or reconstruct the latest version of the metadata. For example, it is assumed that the client has metadata at revision A and the server has metadata at revision B. The client tells the server that it is at revision A. The server sends the difference of (B−A) to the client. If there is no difference, the server just indicates there is no new update available. When the client receives this data, it applies the difference to the local version (A) to obtain B. The package manager then compares the older A with the newer B and then decides if any installed software has updates available for download. At block 204, the package manager examines the second version of the metadata to determine whether there is a need to download a second version of software package represented by the second version of metadata. If so, at block 205, the package manager is configured to download the second version of software package based on the second version of metadata and install the same at the client machine.

Figure 3:
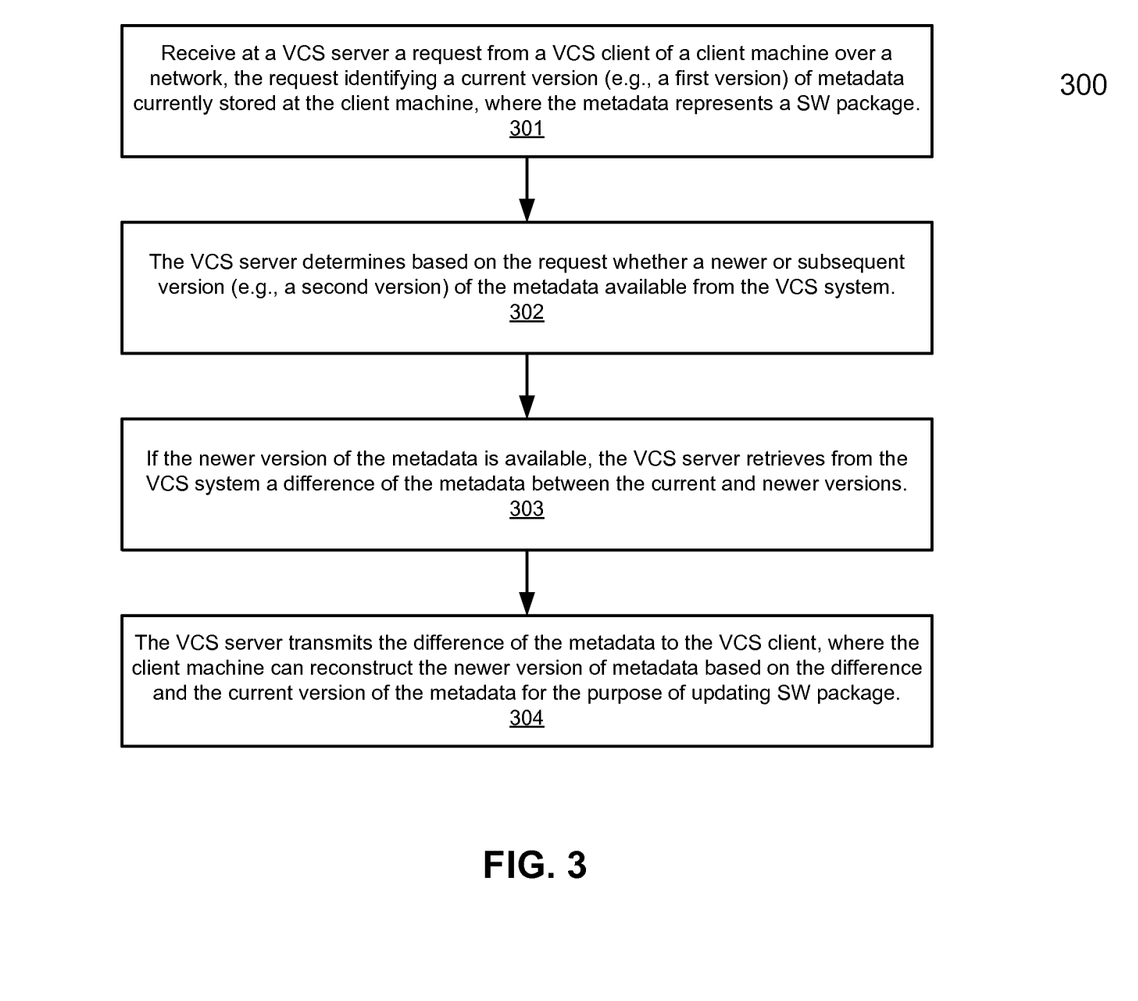
FIG. 3 is a flow diagram illustrating a method for updating software packages according to one embodiment of the invention.

FIG. 3 is a flow diagram illustrating a method for updating software packages according to one embodiment of the invention. For example, method 300 may be performed by VCS server 105 and/or package manager 107 of server 102 of FIG. 1. Referring to FIG. 3, at block 301, a VCS server module of a server receives a request from a VCS client of a client machine over a network, where the request identifies a first version of metadata representing a software package currently installed at the client machine. In response to the request, at block 302, the VCS server module determines whether there is a second version of the metadata available from the VCS system. If so, at block 303, the VCS server module retrieves from the VCS system the difference between the first and second versions of the metadata. In one embodiment, the VCS system generates a patch, as for software code. It is computed by looking at two versions of a file and identifying differences. The utility having a "diff" function can do that, but VCS systems typically have their own tool to compute the difference. At block 304, the VCS server module transmits the difference to the VCS client over a network to allow the VCS client to construct the second version locally at the client machine for the purpose of updating software packages, or for identifying the latest version of an uninstalled software package for future installation, without having to transmit the entire second version of metadata over the network.

Figure 4:
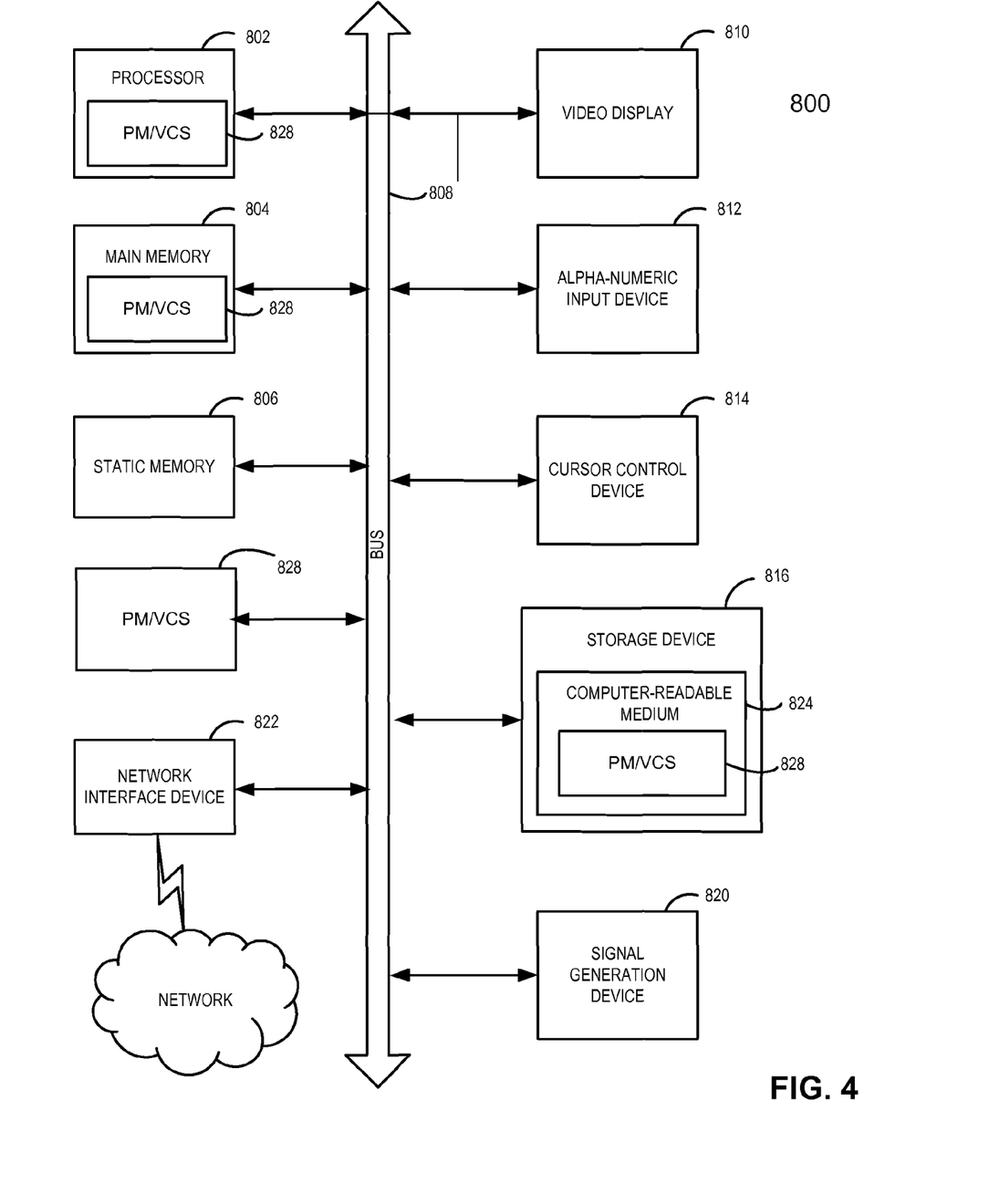
FIG. 4 illustrates a data processing system which may be used with an embodiment of the invention.

FIG. 4 illustrates a data processing system which may be used with an embodiment of the invention. For example, system 800 may represent a client system or a server system as described above. Referring to FIG. 4, system 800 may represent a diagrammatic representation of a machine in the exemplary form of a computer system within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet.

The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processor 802 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processor 802 is configured to execute the instructions 828 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., package manager and/or VCS module 828) embodying any one or more of the methodologies or functions described herein. The module 828 may also reside, completely or at least partially, within the main memory 804 and/or within the processor 802 during execution thereof by the computer system 800, the main memory 804 and the processor 802 also constituting machine-accessible storage media. The module 828 may further be transmitted or received over a network via the network interface device 822.

The computer-readable storage medium 824 may also be used to store the desktop 101 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   sending, by a processor at a client system, a request to a remote version control system (VCS) to obtain a difference between current metadata at the client system and newer metadata at the remote VCS, wherein the request comprises a version identifier of the current metadata, wherein the current metadata is stored locally at the client system, wherein the current metadata comprises names of first software packages currently installed or available at the client system, version identifiers corresponding to the first software packages, and lists of dependencies corresponding to the first software packages, wherein the newer metadata is stored remotely at the remote VCS, wherein the newer metadata comprises names of second software packages from the remote VCS to be installed or made available at the client system after an update to the first software packages, version identifiers corresponding to the second software packages, and lists of dependencies corresponding to the second software packages, and wherein the current metadata and the newer metadata are distinct from the first software packages and the second software packages;
   receiving, at the client system, the difference from the remote VCS in response to sending the request to the remote VCS that comprises the version identifier of the current metadata and without receiving an entirety of the newer metadata from the remote VCS;

reconstructing, at the client system, the newer metadata in view of the locally stored current metadata and the received difference between the locally stored current metadata and the remotely stored newer metadata;

identifying, at the client system, a latest version of a software package in the second software packages in view of a comparison of the names, the versions, and the dependencies of the first software packages from the current metadata with corresponding ones of the names, the versions, and the dependencies of the second software packages from the reconstructed newer metadata; and downloading and installing, at the client system, the latest version of the software package from the remote VCS in view of the identified latest version of the software package from the reconstructed newer metadata.

2. The method of claim 1, wherein a client VCS is invoked by a package manager via an application programming interface (API) in response to a request for updating the first software packages.

3. The method of claim 1, further comprising identifying a current version of the software package in the first software packages from the current metadata, wherein downloading and installing the latest version of the software package is further in view of the current version of the software package from the current metadata.

4. The method of claim 1, wherein the current metadata and the newer metadata identify different versions of a same metadata managed by the remote VCS.

5. The method of claim 1, wherein the newer metadata is stored and managed by the remote VCS in a first server while the software package is provided by a second server.

6. A non-transitory computer-readable storage medium having instructions stored therein, which when executed by a processor, cause the processor to perform operations comprising:

sending, by the processor at a client system, a request to a remote version control system (VCS) to obtain a difference between current metadata at the client system and newer metadata at the remote VCS, wherein the request comprises a version identifier of the current metadata, wherein the current metadata is stored locally at the client system, wherein the current metadata comprises names of first software packages currently installed or available at the client system, version identifiers corresponding to the first software packages, and lists of dependencies corresponding to the first software packages, wherein the newer metadata is stored remotely at the remote VCS, wherein the newer metadata comprises names of second software packages from the remote VCS to be installed or made available at the client system after an update to the first software packages, version identifiers corresponding to the second software packages, and lists of dependencies corresponding to the second software packages, and wherein the current metadata and the newer metadata are distinct from the first software packages and the second software packages;

receiving, at the client system, the difference from the remote VCS in response to sending the request to the remote VCS that comprises the version identifier of the current metadata and without receiving an entirety of the newer metadata from the remote VCS;

reconstructing, at the client system, the newer metadata in view of the locally stored current metadata and the received difference between the locally stored current metadata and the remotely stored newer metadata;

identifying, at the client system, a latest version of a software package in the second software packages in view of a comparison of the names, the versions, and the dependencies of the first software packages from the current metadata with corresponding ones of the names, the versions, and the dependencies of the second software packages from the reconstructed newer metadata; and downloading and installing, at the client system, the latest version of the software package from the remote VCS in view of the identified latest version of the software package from the reconstructed newer metadata.

7. The non-transitory computer-readable storage medium of claim 6, wherein a client VCS is invoked by a package manager via an application programming interface (API) in response to a request for updating the first software packages.

8. The non-transitory computer-readable storage medium of claim 6, wherein the operations further comprise identifying a current version of the software package in the first software packages from the current metadata, and wherein downloading and installing the latest version of the software package is further in view of the current version of the software package from the current metadata.

9. The non-transitory computer-readable storage medium of claim 6, wherein the current metadata and the newer metadata identify different versions of a same metadata managed by the remote VCS.

10. The non-transitory computer-readable storage medium of claim 6, wherein the newer metadata is stored and managed by the remote VCS in a first server while the software package is provided by a second server.

11. A system comprising:

a memory, at a client system, to store current metadata; and a processor at the client system to communicate with the memory to:

send a request to a remote version control system (VCS) to obtain a difference between the current metadata at the client system and newer metadata at the remote VCS, wherein the request comprises a version identifier of the current metadata, wherein the current metadata is stored locally at the client system, wherein the current metadata comprises names of first software packages currently installed or available at the client system, version identifiers corresponding to the first software packages, and lists of dependencies corresponding to the first software packages, wherein the newer metadata is stored remotely at the remote VCS, wherein the newer metadata comprises names of second software packages from the remote VCS to be installed or made available at the client system after an update to the first software packages, version identifiers corresponding to the second software packages, and lists of dependencies corresponding to the second software packages, and wherein the current metadata and the newer metadata are distinct from the first software packages and the second software packages, receive the difference from the remote VCS in response to the delivery of the request to the remote VCS that comprises the version identifier of the current metadata and without receipt of an entirety of the newer metadata from the remote VCS, reconstruct the newer metadata in view of the locally stored current metadata and the received difference between the locally stored current metadata and the remotely stored newer metadata, identify a latest version of a software package in the second software packages in view of a comparison of the names, the versions, and the dependencies of the first software packages from the current metadata with corresponding ones of the names, the versions, and the dependencies of the second software packages from the reconstructed newer metadata, and download and install the latest version of the software package from the remote VCS in view of the identified latest version of the software package from the reconstructed newer metadata.

12. The system of claim 11, wherein a client VCS is invoked by a package manager via an application programming interface (API) in response to a request for updating the first software packages.

13. The system of claim 11, wherein the processor is further to identify a current version of the software package in the first software packages from the current metadata, and wherein the processor is to download and install the latest version of the software package further in view of the current version of the software package from the current metadata.

14. The system of claim 11, wherein the current metadata and the newer metadata identify different versions of a same metadata managed by the remote VCS.

15. The system of claim 11, wherein the newer metadata is stored and managed by the remote VCS in a first server while the software package is provided by a second server.

* * * * *